United States Patent
Klomsdorf (10) Patent No.: US 10,673,514 B1
(45) Date of Patent: Jun. 2, 2020

(54) COMMUNICATION DEVICE WITH RECEIVE ANTENNA TUNING

(71) Applicant: MOTOROLA MOBILITY LLC, Chicago, IL (US)

(72) Inventor: Armin Klomsdorf, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/712,650

(22) Filed: Dec. 12, 2019

(51) Int. Cl.
| | |
|---|---|
| H04B 1/18 | (2006.01) |
| H03H 7/38 | (2006.01) |
| H04B 1/04 | (2006.01) |
| H04B 7/08 | (2006.01) |
| H04B 1/16 | (2006.01) |

(52) U.S. Cl.
CPC ............ *H04B 7/0817* (2013.01); *H04B 1/16* (2013.01)

(58) Field of Classification Search
CPC ...... H04B 1/0458; H04B 1/18; H04B 7/0817; H04B 1/16; H03H 7/38
See application file for complete search history.

(56) References Cited

U.S. PATENT DOCUMENTS

| | | | | |
|---|---|---|---|---|
| 7,764,932 | B2 * | 7/2010 | Rofougaran | H01Q 21/061 |
| | | | | 455/125 |
| 7,844,242 | B2 * | 11/2010 | Rofougaran | H04B 1/0067 |
| | | | | 455/333 |
| 8,204,446 | B2 * | 6/2012 | Scheer | H01Q 1/242 |
| | | | | 455/129 |
| 8,548,088 | B2 * | 10/2013 | Lee, II | H04L 25/03343 |
| | | | | 375/260 |
| 8,712,355 | B2 * | 4/2014 | Black | H04B 1/18 |
| | | | | 455/121 |
| 9,955,238 | B2 * | 4/2018 | Du | H04Q 9/00 |
| 10,381,715 | B2 * | 8/2019 | Han | H01Q 1/245 |
| 10,484,112 | B2 * | 11/2019 | Pascolini | H01Q 1/273 |
| 2010/0120466 | A1 * | 5/2010 | Li | H04B 1/006 |
| | | | | 455/552.1 |
| 2011/0043286 | A1 * | 2/2011 | Youngblood | H03D 7/1441 |
| | | | | 330/295 |

\* cited by examiner

*Primary Examiner* — Pablo N Tran
(74) *Attorney, Agent, or Firm* — Yudell Isidore PLLC (57) ABSTRACT

A communication device, method, and computer program product provide configuring, by a controller, a switching matrix of a radio frequency (RF) frontend of the communication device to a receive antenna tuning mode. The receive antenna tuning mode communicatively couples a transmitter to a first receive antenna of one or more receive antennas. A reference signal is transmitted using the first receive antenna at a selected transmit power level setting of the transmitter. A feedback receiver measures magnitude and phase values of both a forward coupled transmission signal and a reverse coupled reflection signal of the reference signal. An impedance value of the first receive antenna is determined based on the measured magnitude and phase values and the reference signal transmitted at the selected transmit power level setting. The first receive antenna is tuned by an antenna tuning module using the impedance value.

18 Claims, 6 Drawing Sheets

COMMUNICATION DEVICE WITH RECEIVE ANTENNA TUNING

1. TECHNICAL FIELD

The present disclosure relates generally to communication devices that receive downlink communication on receive antennas, and in particular to communication devices that impedance tune receive antennas.

2. DESCRIPTION OF THE RELATED ART

Cellular network technology has developed in stages that are referred to as generations (G). Cellular communications have expanded into multiple communication bands and modulation schemes through the evolution of the telecommunications standard from first generation (1G), second generation (2G), third generation (3G), fourth generation (4G), and now fifth generation (5G). With the advent of 5G, the number of antennas in communication devices, such as a smartphone, is increasing. It is typical to have eight (8) sub 6 GHz antennas in a communication device that incorporates 5G new radio (NR) radio access technology (RAT). Not all of these antennas are used for transmitting data traffic. Several antennas are dedicated to receiving operations, such as for 2×2 or 4×4 multiple input multiple output (MIMO) operations. Typically, the physical dimension of the antenna is not ideal for a particular frequency band and requires antenna tuning for electrical length or impedance. Since the dedicated receive antennas are not used to transmit, opportunities are not presented for closed loop tuning (e.g., impedance matching, aperture tuning, etc.). Consequently, product performance for radiated total isotropic sensitivity (TIS) is several decibels below optimum antenna tuning for these dedicated receive antennas.

The existing solution for tuning receive antennas is to use open loop or advanced open loop tuning. Open loop tuning uses a predetermined antenna match tune code for a given band. The tune code is fixed for that band and will not change as antenna loading/impedance changes. This results in non-optimal system efficiency for some antenna-user interaction cases. Advanced open loop tuning can be used to map various radio states to corresponding antenna tune codes that account, to a degree, for physical connections to the communication device, such as a headset jack or a charging cord. However, an advanced open loop tuning system is incapable of dynamically tuning for antenna impedance changes due to antenna-user interactions. The existing open loop tuning schemes will leave several dB of system efficiency unrealized. Realizing every dB possible in system efficiency is becoming ever more important as antenna volume and radiation efficiency are sacrificed to provide users with a large bezel-less display that leaves less room for antennas.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to aspects of the present disclosure, a communication device, method, and computer program product provide for closed loop tuning of receive antennas, resulting in an improvement in receive system efficiency by several decibels. A controller of the communication device configures a switching matrix of a radio frequency (RF) frontend of the communication device to a receive antenna tuning mode. The receive antenna tuning mode communicatively couples a transmitter to a first receive antenna of one or more receive antennas. A reference signal is transmitted using the first receive antenna at a selected transmit power level setting of the transmitter. A feedback receiver measures magnitude and phase values of both a forward coupled transmission signal and a reverse coupled reflection signal of the reference signal. An impedance value of the first receive antenna is determined based on the measured magnitude and phase values and the reference signal transmitted at the selected transmit power level setting. The first receive antenna is tuned by an antenna tuning module using the impedance value.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

Figure 1:
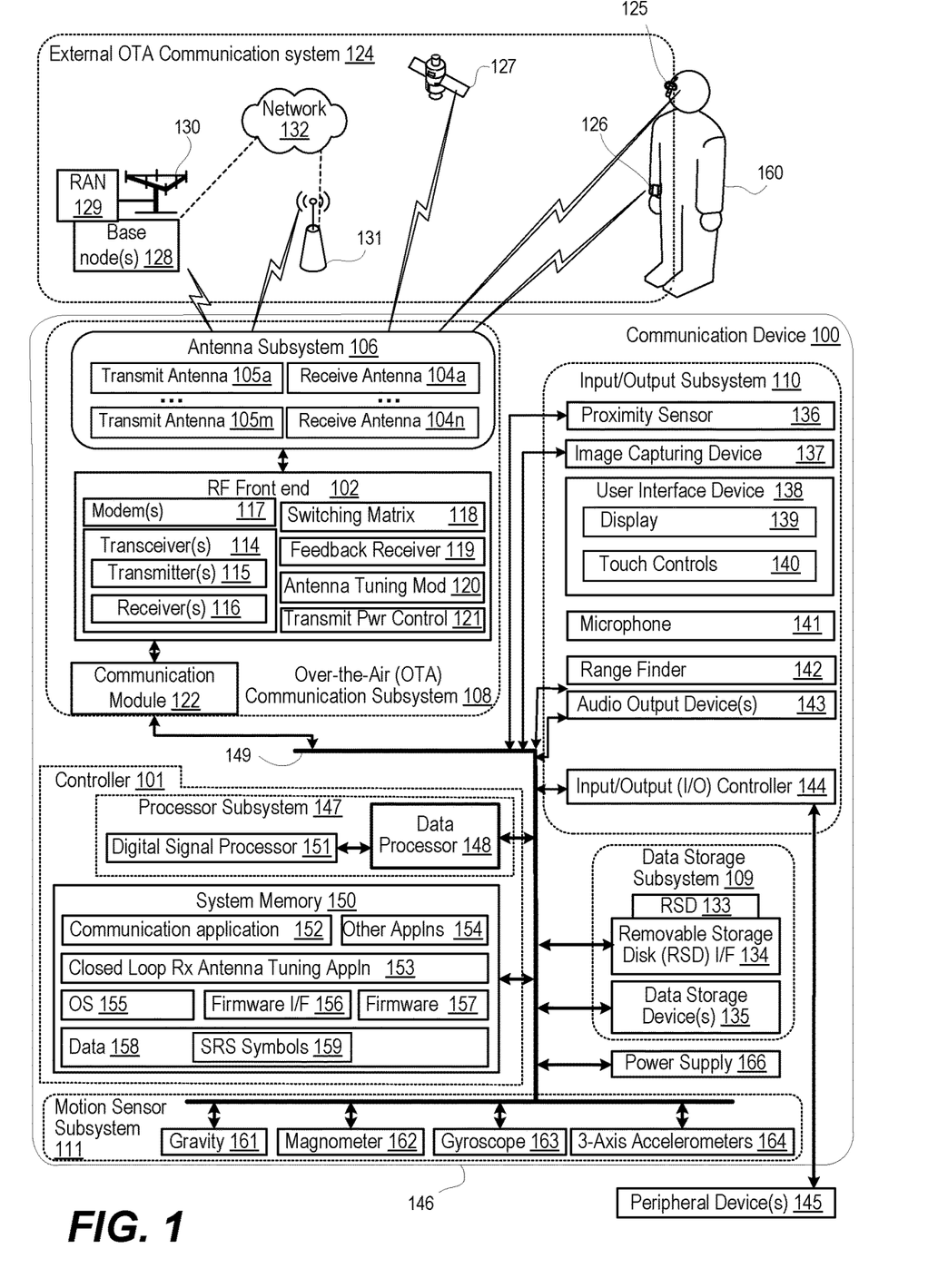
FIG. 1 is a functional block diagram of a communication device having a radio frequency (RF) front end that tunes receive antennas of an antenna subsystem, according to one or more embodiments.

FIG. 1 is a functional block diagram of example communication device 100 in an operating environment within which the features of the present disclosure are advantageously implemented. In the illustrated embodiment, communication device 100 has controller 101 that triggers RF frontend 102 to perform closed-loop tuning of dedicated receive antennas 104a-n and transmit antennas 105-m of antenna subsystem 106 for increased system efficiency. Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. These various devices all provide and/or include the necessary hardware and software to support the various wireless or wired communication functions as part of a communication system. Communication device 100 can be intended to be portable, hand-held, wearable, detachable, positioned in a fixed location, or mounted to a movable vehicle.

Referring now to the specific component makeup and the associated functionality of the presented components. In one or more embodiments, communication device 100 includes over-the-air (OTA) communication subsystem 108, data storage subsystem 109, input/output subsystem 110, and motion sensor subsystem 111 that are managed by controller 101. OTA communication subsystem 108 includes antenna subsystem 106 having receive antennas 104a-104n and transmit antennas 105a-105m. OTA communication subsystem 108 includes RF frontend 102 having transceiver(s) 114 that includes transmitter(s) 115 and receiver(s) 116. RF frontend 102 further includes modem(s) 117, switching matrix 118, feedback receiver 119, antenna tuning module 120, and transmit power control 121. OTA communication subsystem 108 includes communication module 122. OTA communication subsystem 108 communicates with external OTA communication system 124. External OTA communication system 124 can include devices such as wireless headset 125 and smart watch 126. External communication system 124 can include global positioning system (GPS) satellites 127, base node(s) 128 of RANs 129 that transmit and receive via radio tower 130, access node 131, and networks 132.

Data storage subsystem 109 of communication device 100 includes removable storage device (RSD) 133, RSD interface (I/F) 134, and data storage device(s) 135. In one or more embodiments, removable storage device (RSD) 133, which is received in RSD interface 134, is a computer program product or computer readable storage device, which can be referred to as non-transitory. RSD 133 can be accessed by controller 101 to provision communication device 100 with program code. When executed by controller 101, the program code causes or configures communication device 100 to provide the functionality described herein.

I/O subsystem 110 includes proximity sensor 136 and image capturing device 137. I/O subsystem 110 also includes user interface device(s) 138 having display 139 and touch controls 140. I/O subsystem 110 also includes microphone 141, range finder 142, and audio output device 143. I/O subsystem 110 also includes I/O controller 144, which connects to peripheral devices 145 external to housing 146 of communication device 100. I/O controller 144 can provide drive signals and receive sensor readings in formats compatible with peripheral device 145. I/O controller 144 can act as a communication interface for peripheral device 145 and other parts of communication device 100.

Controller 101 includes processor subsystem 147, which includes one or more central processing units (CPUs), depicted as data processor 148, that are communicatively coupled, via system interlink 149, to system memory 150. Processor subsystem 147 can include one or more digital signal processors 151 that are integrated with data processor 148 or are communicatively coupled, via system interlink 149, to data processor 148. System memory 150 includes applications such as communication application 152, closed loop receive antenna tuning (CLRAT) application 153 and other application(s) 154. System memory 150 further includes operating system (OS) 155, firmware interface (I/F) 156, such as basic input/output system (BIOS) or Uniform Extensible Firmware Interface (UEFI), and other firmware 157. System memory 150 includes data 158 such as sounding reference signal (SRS) symbols data 159 used by CLRAT application 153.

Processor subsystem 147 of controller 101 executes program code to provide operating functionality of communication device 100. These software and/or firmware modules have varying functionality when their corresponding program code is executed by processor subsystem 147 or secondary processing devices within communication device 100. Processor subsystem 147 of controller 101 can execute program code of CLRAT application 153 to improve system efficiency of dedicated receive antennas. The efficiency of an antenna is a ratio of the power delivered to the antenna relative to the power radiated from the antenna. A high efficiency antenna has most of the power present at the antenna's input radiated away. Controller 101 controls the various functions and/or operations of electronic device 100. These functions and/or operations include, but are not limited to including, application data processing, communication with other electronic devices, navigation tasks, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

In one or more embodiments, controller 101 of communication device 100 is communicatively coupled via system interlink 149 to OTA communication subsystem 108, data storage subsystem 109, input/output subsystem 110, and motion sensor subsystem 111. System interlink 149 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 149) are illustrated in FIG. 1, it is to be understood that more, fewer, or different interconnections may be present in other embodiments.

Communication module 122 of OTA communication subsystem 108 operates in baseband frequency range to encode data for transmission and decode received data, according to a communication protocol. Modem(s) 117 modulate baseband encoded data from communication module 122 onto a carrier signal to provide a transmit signal that is amplified by transmitter(s) 115. Modem(s) 117 demodulates the received signal from base node(s) 128 or access node 131 detected by antenna subsystem 106. The received signal is amplified and filtered by receiver(s) 116, which demodulate received encoded data from a received carrier signal. Antenna tuning module 120 adjusts antenna impedance of antenna subsystem 106. Antenna tuning module 120 improves antenna efficiency at desired transmit or receive frequencies of transmitter(s) 115 and receiver(s) 116, respectively, within transceiver(s) 114. Antenna tuning module 120 is electrically coupled to antenna subsystem 106 and compensates for any lossy dielectric effect of being proximate to person 160. In one or more embodiments, antenna subsystem 106 includes transmit antennas 105a-m and receive antennas 104a-n that are individually tuned to selected RF bands to support different RF communication bands and protocols. Transmit antennas 105a-m and receive antennas 104a-n can be used in combination for multiple input multiple output (MIMO) operation for beam steering and spatial diversity.

In one or more embodiments, controller 101, via OTA communication subsystem 108, performs multiple types of OTA communication with external OTA communication system 124. OTA communication subsystem 108 can communicate via Bluetooth connection with one or more personal access network (PAN) devices, such as wireless headset 125 and smart watch 126. Communication via Bluetooth connection includes both transmission and reception via a Bluetooth transceiver device. In one or more embodiments, OTA communication subsystem 108 communicates with one or more locally networked devices via a wireless local area network (WLAN) link provided by access node 131. Access node 131 is connected to wide area network 132, such as the Internet. In one or more embodiments, OTA communication subsystem 108 communicates with GPS satellites 127 to obtain geospatial location information. In one or more embodiments, OTA communication subsystem 108 communicates with RANs 129 having respective base stations (BSs) or base node(s) 128. RANs 129 are a part of a wireless wide area network (WWAN) that is connected to wide area network 132.

Data storage subsystem 109 provides nonvolatile storage that is accessible by controller 101. For example, data storage subsystem 109 can provide a large selection of other applications 154 that can be loaded into system memory 150. In one or more embodiments, local data storage device(s) 135 includes hard disk drives (HDDs), optical disk drives, solid state drives (SSDs), etc.

Axes-based motion sensor subsystem 111 includes one or more sensors that individually, or in combination, indicate orientation and motion of communication device 100. In one or more embodiments, gravity sensor 161 can be used to measure relative orientation with respect to the Earth's gravitational field. Magnetometer 162 is configured to measure strength and direction of a magnetic field in space that indicate direction relative to the magnetic geographic cardinal coordinates north, south, east, and west. Gyroscope 163 is configured to generate and provide sensor data that indicates orientation of communication device 100 along the three X-Y-Z axes based on rotation or angular momentum of communication device 100 around the multiple axes. Three-axis accelerometer 164 is configured to generate and provide sensor data that indicates acceleration that communication device 100 is experiencing relative to freefall, which can be used to determine orientation of electronic device 100 along the three axes, based on linear motion and gravity. Gravity sensor 161, magnetometer 162, gyroscope 163, and accelerometer 164 can be used alone or in combination to determine the relative orientation of communication device 100 in space, including azimuth, pitch, and roll with respect to magnetic north and with respect to the horizontal and vertical axes relative to the direction of gravity. Communication device 100 receives and distributes electrical power from power supply 166, such as a battery for mobile use or alternating current-direct current (AC-DC) converter for stationary use.

In one or more embodiments, controller 101 enables communication device 100 to perform closed loop impedance tuning of receive antennas 104a-104n using management capabilities of processor subsystem 147. In one or more embodiments, controller 101 is distributed to include management capabilities incorporated into OTA communication subsystem 108. A baseband controller such as communication module 122 can have direct control of switching matrix 118, feedback receiver 119, and antenna tuning module 120. Data processor 148 of controller 101 can detect trigger events and prompt communication module 122 to perform SRS symbol transmission, measurement and tuning. In one or more embodiments, controller 101 for purposes of receive antenna tuning can be autonomously executed within OTA communication subsystem 108. A receive antenna tuning mode can be triggered based on a recurring schedule, detection of a change of operating mode, detection of user proximity to receive antennas 104a-104n, or prompted by a remote network entity such as base node 128.

Figure 2:
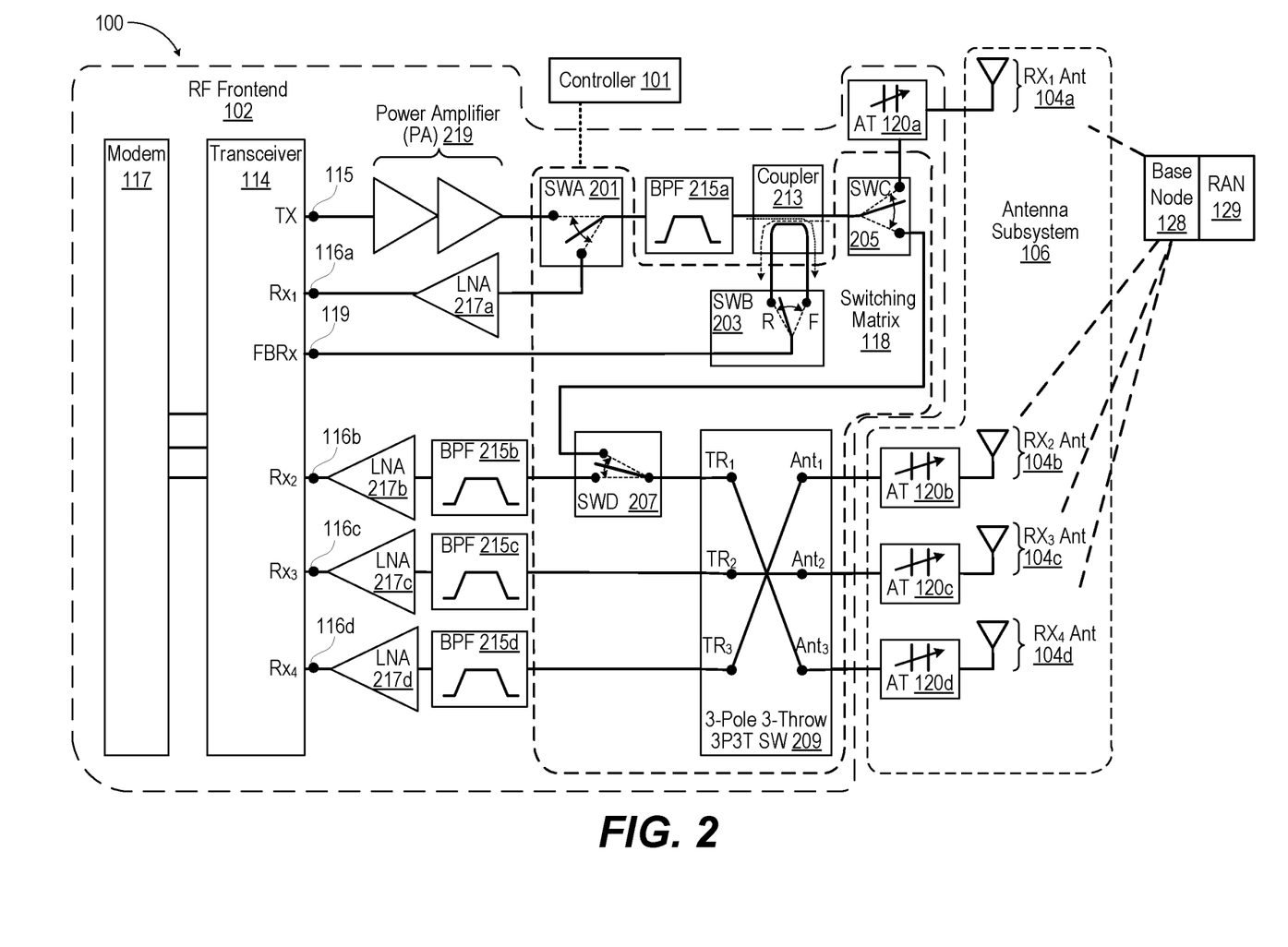
FIG. 2 is a functional block diagram of an example communication device having an RF frontend and antenna subsystem that is configurable to perform sound reference signal (SRS) impedance measurement of receive antennas, according to one or more embodiments.

FIG. 2 depicts a functional block diagram of example RF frontend 102 and antenna subsystem 106 of communication device 100 that is configurable to perform closed loop tuning of receive antennas 104a-d by corresponding antenna tuning modules 120a-d. Switching matrix 118 includes three-pole switches, SWA 201, SWB 203, SWC 205, and SWD 207, and three-pole, three-throw (3P3T) switch 209 that are each configured by controller 101. Modem 117 provides an uplink signal to transceiver 114 and receives a downlink signal from transceiver 114. Transceiver 114 includes transmitter (TX) 115, receivers ($Rx_1$-$Rx_4$) 116a-d, and feedback receiver (FBRx) 119. 3P3T switch 209 is switchable to connect selected one of transceiver terminals ($TR_1$, $TR_2$, and $TR_3$) respectively to a selected one of antenna terminals ($Ant_1$, $Ant_2$, $Ant_3$). A switch state of 3P3T switch 209 can include electrically coupling a single transceiver terminal to a single antenna terminal. A switch state of 3P3T switch 209 can include electrically coupling all three transceiver terminals to respective antenna terminals.

Figure 3:
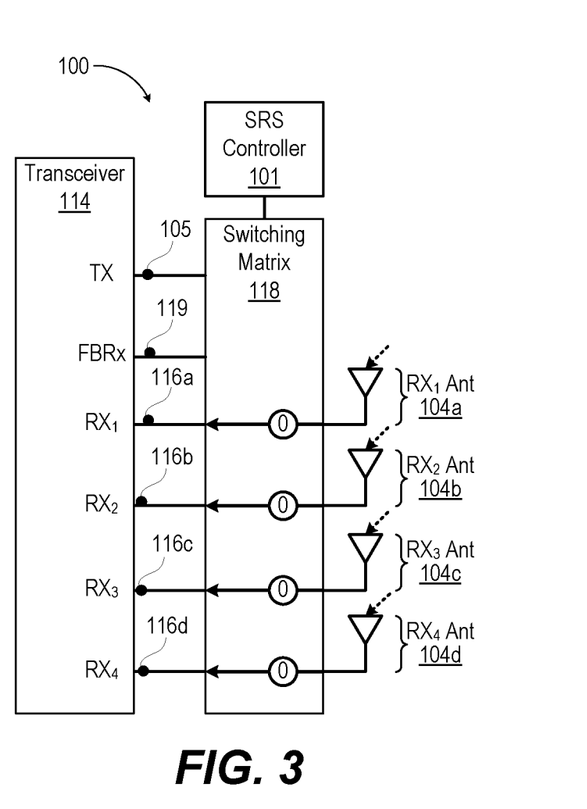
FIG. 3 is a simplified block diagram of the communication device of FIG. 2 having a switching matrix of the RF frontend configured in a receive state, according to one or more embodiments.

With switching matrix 118 configured to receive mode by controller 101, a first receive path is provided from first receive antenna 104a to receiver 116a. The first receive path includes SWC 205, coupler 213, bandpass filter (BFP) 215a, SWA 201, and low noise amplifier (LNA) 217a. A second receive path from second receive antenna 104b to receiver 116b includes coupling of first antenna ($Ant_1$) terminal to first transceiver ($TR_1$) terminal of 3P3T switch 209, SWD 207, BPF 215b, and LNA 217b. A third receive path from third receive antenna 104c to receiver 116c includes coupling of second antenna ($Ant_2$) terminal to second transceiver ($TR_2$) terminal of 3P3T switch 209, BPF 215c, and LNA 217c. A fourth receive path from fourth receive antenna 104d to receiver 116d includes coupling of third antenna ($Ant_3$) terminal to third transceiver ($TR_3$) terminal of 3P3T switch 209, BPF 215d, and LNA 217d. This receive mode (State "0") is summarized in the first Row of TABLE 1. FIG. 3 depicts the signal paths in State "0".

TABLE 1

| State | Description | SW A | SW B | SW C | SW D | 3P3T SW |
|---|---|---|---|---|---|---|
| 0 | 4 RX | Down | X | Up | Down | $TR_1 \rightarrow Ant_1$/ $TR_2 \rightarrow Ant_2$/ $TR_3 \rightarrow Ant_3$ |
| 1A | SRS 1 Fwd | Up | Fwd | Up | X | X |
| 1B | SRS 1 Rev | Up | Rev | Up | X | X |
| 2A | SRS 2 Fwd | Up | Fwd | Down | Down | $TR_1 \rightarrow Ant_1$ |
| 2B | SRS 2 Rev | Up | Rev | Down | Down | $TR_1 \rightarrow Ant_1$ |
| 3A | SRS 3 Fwd | Up | Fwd | Down | Down | $TR_1 \rightarrow Ant_2$ |
| 3B | SRS 3 Rev | Up | Rev | Down | Down | $TR_1 \rightarrow Ant_2$ |
| 4A | SRS 4 Fwd | Up | Fwd | Down | Down | $TR_1 \rightarrow Ant_3$ |
| 4B | SRS 4 Rev | Up | Rev | Down | Down | $1TR_1 \rightarrow Ant_3$ |

FIG. 3 depicts a simplified block diagram of communication device 100 with switching matrix 118 in receive state "0". All of the switches of switching matrix 118 are depicted as a single box, and thus showing the functional response to the state "0" as a "black box" component. Those switches include SWA 201, SWB 203, SWC 205, and SWD 207, and three-pole, 3P3T switch 209 (FIG. 2). All four receivers and receive antennas are active simultaneously receiving. For clarity, all four receive channels are active. In one or more embodiments, fewer than four channels may be active. With reference to FIG. 2, all four receive antennas 104a-d are receiving ("4 RX"). Controller 101 toggles switch A (SWA) 201 to indirectly connect first receiver 116a to first receive antenna 104a. In receive state "0", the switch state of SWA 201 is switch down. In one or more embodiments, feedback receiver 119 is not used in receive mode, so the position of SWB 203 is "X" indicating switch state of "do not care" or "not defined". In receive state "0", SWC 205 is in a switch state of being an "Up" position that at least indirectly couples coupler 213 to first receive antenna 104a. In receive state "0", the switch state of SWD 207 is in a "Down" position that at least indirectly couples second receiver 116b to second receive antenna 104b. 3P3T switch 209 couples respectively each receive antenna 104b-104d to each receiver 116b-116d.

Figure 4:
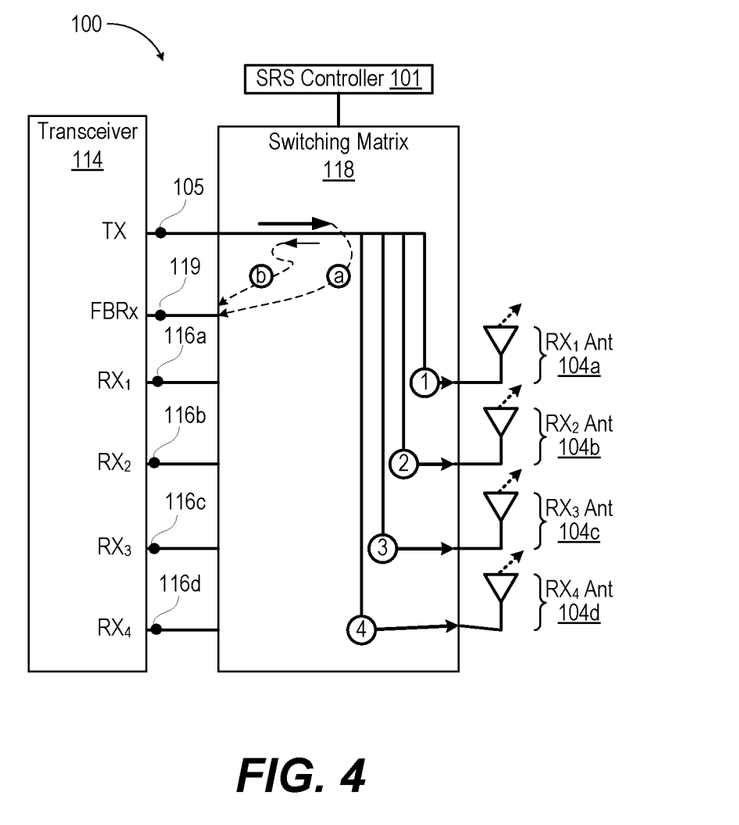
FIG. 4 is a simplified block diagram of the communication device of FIG. 2 having the switching matrix configured in receive antenna tuning states, according to one or more embodiments.

RF frontend 102 periodically transmits one or more reference signals. In one or more embodiments, communication device 100 manages the parameters of the transmission of the reference signals including selection of receive antenna 104b-104d, scheduling of transmission, content and frequencies of transmission, and transmit power. Communication device 100 selects transmission power to be below any regulatory limit such as to be ignored by base node 128 as an unintended transmission. In one or more embodiments, the reference signal is transmitted by communication device 100 according to procedures for sounding reference signal (SRS) transmissions under management of base node 128. Base node 128 selects receive antenna 104b-104d, scheduling of transmission, content and frequencies of transmission, and transmit power for one, two, or four SRS symbols, on an uplink via transmit antenna(s) 105a-105m (FIG. 1) to base node 128. Base node 128 measures received signal strength, enabling RAN 129 to estimate the quality of the channel at different frequencies. According to aspects of the present innovation, switching matrix 118, managed by controller 101, reconfigures RF frontend 102 to use SRS transmission capabilities for impedance measurement and tuning of receive antennas 104a-104d. The sequence of tuning modes of switching matrix 118, managed by controller 101, are listed in the other rows of TABLE 1 and depicted in FIG. 4. FIG. 4 depicts a simplified block diagram of communication device 100 with switching matrix 118 with signal paths configured sequentially in four receive antenna tuning states 1-4, each with two measurement sub-states A-B. States 1-4 respectively correspond to transmitting one, two or four SRS symbols with measurement of the forward coupled transmission signal in sub-state A and reverse coupled reflection signal in sub-state B. All of the switches of switching matrix 118 are depicted as a single box, and thus showing the functional responses to the sequential states "0" as a "black box" component. Those switches include SWA 201, SWB 203, SWC 205, and SWD 207, and three-pole, 3P3T switch 209 (FIG. 2).

With reference to FIG. 2, switching matrix 118 is sequentially reconfigured by controller 101 to transmit SRS symbols at a selected one of receive antennas 104a-d. The switch positions for each step of the sequential reconfiguration are provided as the remaining rows in TABLE 1. A transmission signal from transmitter 115 passes through power amplifier (PA) 219 to SWA 201, which is in an UP position for sequentially selecting each of the four receive antennas 104a-d. The forward transmission signal in each instance passes through coupler 213, and a reverse reflection signal caused by an impedance change downstream also passes through coupler 213 in the reverse direction. SWB 203 is either in a forward coupled position (Sub-state A) or a reverse coupled position (Sub-state B). In the forward coupled position of Sub-state A, SWB 203 directs a portion of a forward coupled transmission to FBRx 119 to measure magnitude and phase of the transmission directly from transmitter 115. In the reverse coupled position of Sub-state B, SWB 203 directs a portion of a reverse coupled reflection to FBRx 119 to measure magnitude and phase of the reflection from the selected one of receive antennas 104a-d. These measurements are performed for each receive antenna 104a-d:

States 1A-B (TABLE 1): To select first receive antenna 104a, SWC 205 is UP, indirectly coupling first receive antenna 104a to coupler 213. SWA 201 remains in the up position, coupling transmitter 115 indirectly to coupler 113. For states 1A and 1B, SWC 205 in the UP position couples transmitter 115 to first receive antenna 104a. Positions of SWD 207 and 3P3T switch 209 are not determinative.

States 2A-B (TABLE 1): To select second receive antenna 104b, SWC 205 is DOWN, SWD 207 is UP, and the switch state of 3P3T switch 209 couples $TR_1$ terminal to $Ant_1$ terminal.

States 3A-B (TABLE 1): To select third receive antenna 104c, SWC 205 is DOWN, SWD 209 is UP, and the switch state of 3P3T switch 209 couples $TR_1$ terminal to $Ant_2$ terminal.

States 4A-B (TABLE 1): To select fourth receive antenna 104d, SWC 205 is DOWN, SWD 209 is UP, and the switch state of 3P3T switch 209 couples $TR_1$ terminal to $Ant_3$ terminal.

For states 2A, 2B, 3A, 3B, 4A, and 4B, SWC 205 is DOWN, SWD 207 is UP, and the selected switch state of 3P3T switch 209 couples $TR_1$ terminal to the selected $Ant_1$-$Ant_3$ terminal that corresponds to receive antennas 104b-d respectively.

Figure 5A:
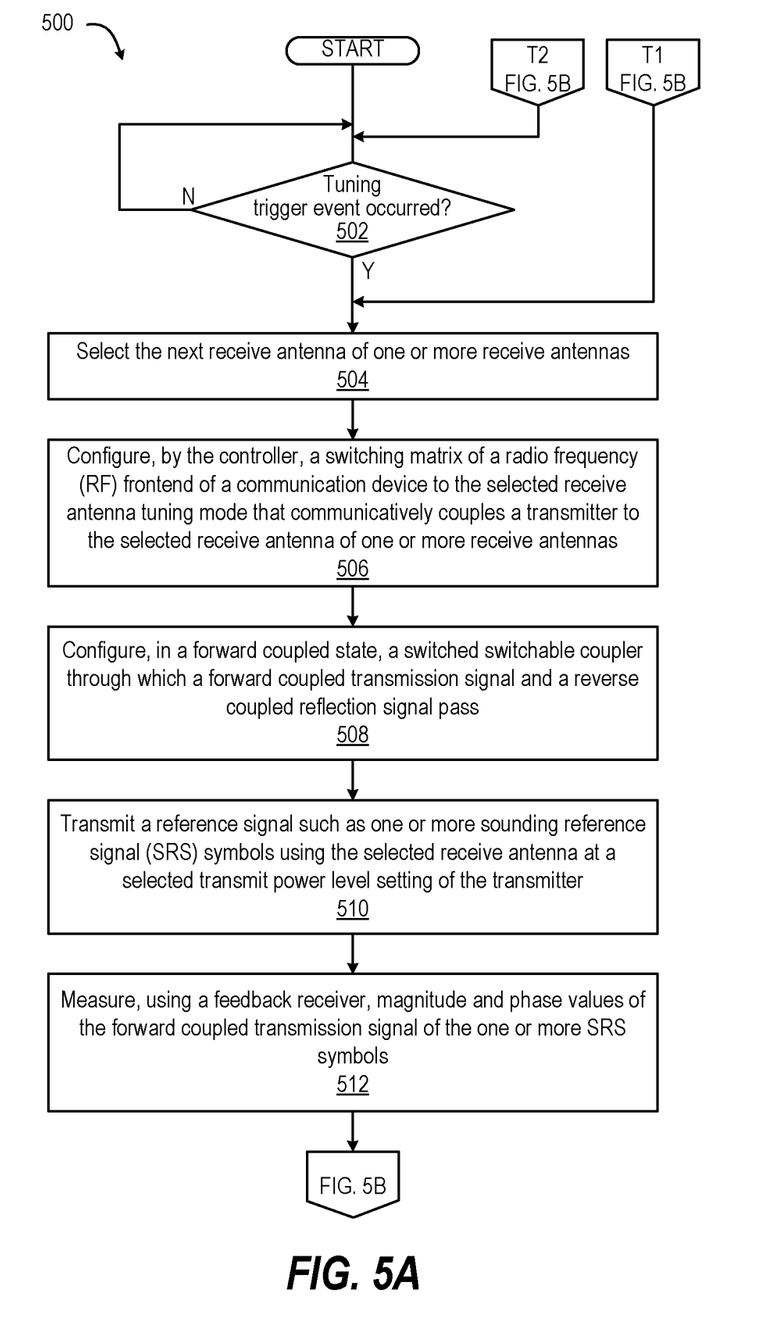
FIGS. 5A-5B (FIG. 5) depict a flow diagram of a method for closed loop tuning of one or more receive antennas of the communication device, according to one or more embodiments.
Figure 5B:
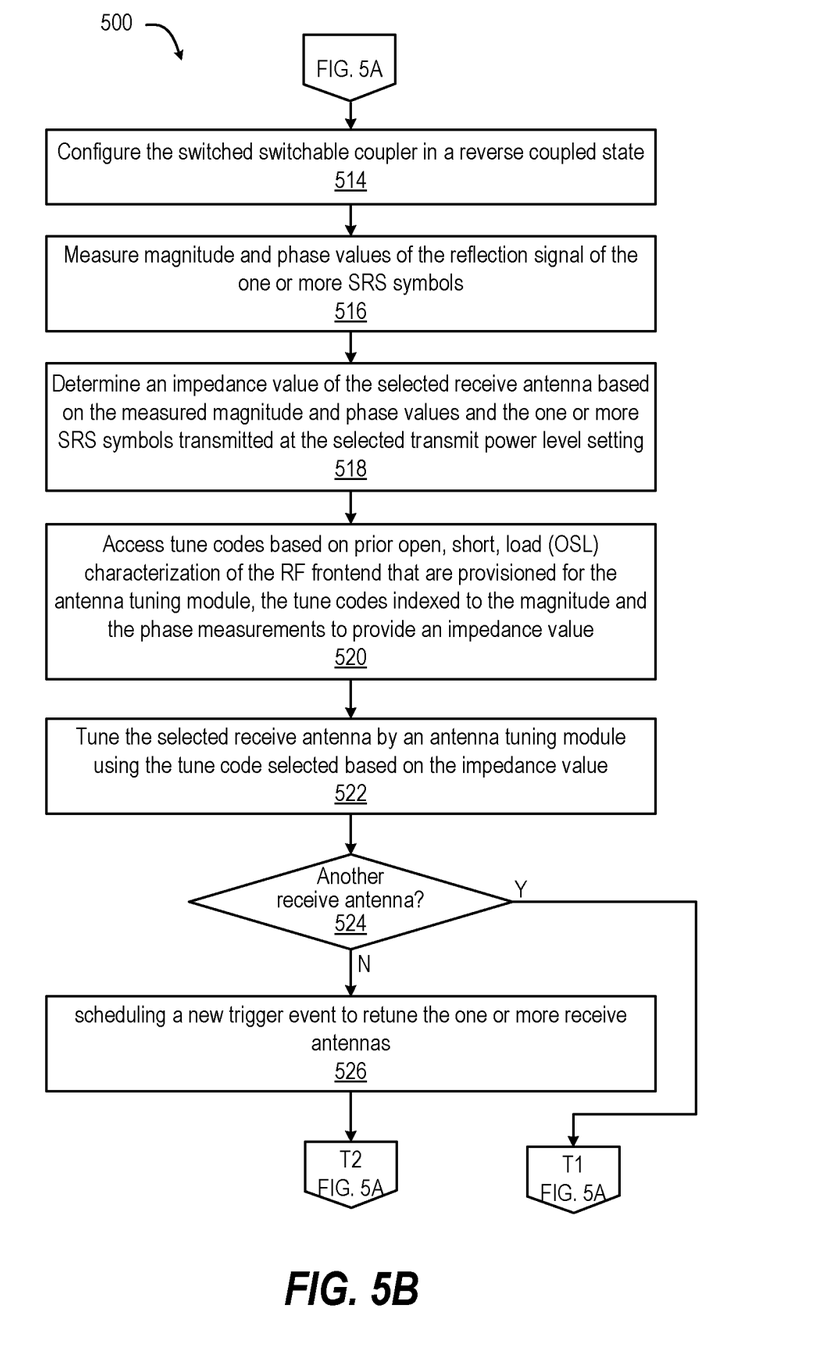

FIGS. 5A-5B (FIG. 5) depict a flow diagram of method 500 for closed loop tuning of one or more receive antennas 104a-104n of communication device 100 (FIG. 1). In one or more embodiments, controller 101 enables communication device 100 (FIG. 1) to perform method 500 by the execution of code, such as CLRAT application 153 (FIG. 1). With reference to FIG. 5A, method 500 includes determining, in decision block 502, whether a trigger event has occurred to prompt closed loop tuning of one or more receive antennas. An example of a trigger event is expiration of timer that is set to periodically retune the receive antennas. An example of a trigger event is detection of a change in mode of operation of the communication device that is indicative of antenna-person interaction that results in a change in impedance of the receive antenna. An example of a trigger event is an indication from a servicing node such as base node 128 or access node 131 that communication device 100 should retune receive antennas 104a-n (FIG. 1). In response to determining that the trigger event has not occurred, method 500 returns to block 502. In response to determining that a trigger event has occurred, method 500 includes selecting, by a controller, a next receive antenna of one or more receive antennas (block 504). Method 500 includes configuring, by controller 101 (FIG. 1), a switching matrix 118 (FIG. 1) of RF frontend 102 (FIG. 1) of communication device 100 (FIG. 1) to the selected receive antenna tuning mode that communicatively couples a transmitter to the selected receive antenna of one or more receive antennas (block 506). Method 500 includes configuring, in a forward coupled state, a switched switchable coupler through which a forward coupled transmission signal and a reverse coupled reflection signal pass (block 508). Method 500 includes transmitting a reference signal, such as one or more sounding reference signal (SRS) symbols, using the selected receive antenna at a selected transmit power level setting of the transmitter (block 510). In one or more embodiments, transmit power level setting is selected based on one or more considerations: (i) to be less than any regulatory transmission limits; (ii) to be sufficiently high for a reflection signal to be measurable by the feedback receiver; and (iii) to be below any threshold level set to avoid interference with other communication devices. Method 500 includes measuring, using a feedback receiver, magnitude and phase values of the forward coupled transmission signal of the one or more SRS symbols (block 512).

With reference to FIG. 5B, method 500 includes configuring the switched switchable coupler in a reverse coupled state (block 514). Method 500 includes measuring magnitude and phase values of the reflection signal of the one or more SRS symbols (block 516). Method 500 includes determining an impedance value of the selected receive antenna based on the measured magnitude and phase values and the one or more SRS symbols transmitted at the selected transmit power level setting (block 518). Method 500 includes accessing tune codes based on prior open, short, load (OSL) characterization of the RF frontend that are provisioned for setting the antenna tuning module. The tune codes are indexed to the magnitude and the phase measurements to provide an impedance value (block 520). In one or more embodiments, the tune codes are stored in system memory. Method 500 includes tuning the selected receive antenna by an antenna tuning module using the tune code selected based on the impedance value (block 522). A determination is made, in decision block 524, whether another receive antenna of the more than one receive antennas remains to be tuned. In response to determining that another receive antenna remains to be tuned, method 500 returns to block 504 (FIG. 5A). In response to determining that no other receive antenna remains to be tuned, method 500 includes scheduling a new trigger event to retune the one or more receive antennas (block 526). For example, a user may change proximity to a receive antenna. Returning one or more times per second can provide dynamic performance adjustments that compensate for these changes. Then method 500 returns to block 502 (FIG. 5A).

In one or more embodiments, the one or more antennas are a two-by-two multiple input multiple output (MIMO) antenna array. Method 500 includes configuring the switching matrix to the receive antenna tuning mode by selecting, in sequence, each one of a first and a second receive antenna tuning mode that communicatively couples the transmitter respectively to a first and a second receive antenna of the one or more antennas. Method 500 includes tuning the corresponding one of the first and the second receive antennas using impedance determined based on transmitting the one or more SRS symbols.

In one or more embodiments, the one or more antennas are a four-by-four MIMO antenna array. Method 500 includes configuring the switching matrix to the receive antenna tuning mode by selecting, in sequence, each one of a first, a second, a third, and a fourth receive antenna tuning mode that communicatively couples the transmitter respectively to a first, a second, a third, and a fourth receive antenna of the one or more antennas. Method 500 includes tuning a corresponding one of the first, the second, the third, and the fourth receive antennas using impedance determined based on transmitting the one or more SRS symbols.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
    an antenna subsystem comprising one or more receive antennas;
    a radio frequency (RF) frontend comprising:
        a transmitter;
        one or more receivers;
        a feedback receiver;
        an antenna tuning module coupled to the one or more receive antennas; and
        a switching matrix configurable to communicatively couple the antenna subsystem, the transmitter, the one or more receivers, and the feedback receiver in one of: (i) a communication mode with the one or more receive antennas communicatively coupled to the one or more receivers; and (ii) a receive antenna tuning mode with the transmitter communicatively coupled to a first receive antenna of the one or more receive antennas; and
    a memory a closed loop receive antenna tuning (CLRAT) application; and
    a controller communicatively coupled to the RF frontend and the memory and that executes the CLRAT application to enable the communication device to:
        configure the switching matrix to the receive antenna tuning mode;
        transmit the reference signal using the first receive antenna at a selected transmit power level setting of the transmitter;
        measure magnitude and phase values of both the transmission signal and the reflection signal of the reference signal using the feedback receiver;
        determine an impedance value of the first receive antenna based on the measured magnitude and phase values and the reference signal transmitted at the selected transmit power level setting; and
        tune the first receive antenna by the antenna tuning module using the determined impedance value.

2. The communication device of claim 1, wherein:
    the memory contains one or more sounding reference signal (SRS) symbols;
    the controller executes the CLRAT application to enable the communication device to transmit the reference signal comprising one or more SRS symbols.

3. The communication device of claim 1, further comprising a switchable coupler through which the transmission signal and the reflection signal pass and configurable in one of: (i) a forward coupled state; and (ii) a reverse coupled state to communicative a corresponding portion of the transmission signal and the reflection signal to the feedback receiver, wherein the controller executes the CLRAT application to enable the communication device to:
- configure the switched switchable coupler in the forward coupled state;
- measure magnitude and phase values of the transmission signal of the reference signal using the feedback receiver;
- configure the switched switchable coupler in the reverse coupled state; and
- measure magnitude and phase values of the reflection signal of the reference signal using the feedback receiver.

4. The communication device of claim 1, wherein:
the antenna tuning module is provisioned with tune codes based on prior open, short, load (OSL) characterization of the RF frontend, the tune codes indexed to the magnitude and the phase measurements to provide the impedance value.

5. The communication device of claim 1, wherein:
the one or more receive antennas comprises a two-by-two multiple input multiple output (MIMO) antenna array having a first and a second receive antenna;
the switching matrix is configurable to: (i) a first receive antenna tuning mode that communicatively couples the transmitter to the first receive antenna; and (ii) a second receive antenna tuning mode that communicatively couples the transmitter to the second receive antenna; and
for each of the first and the second receive antenna tuning modes, the controller executes the CLRAT application to enable the communication device to tune a corresponding one of the first and the second receive antennas.

6. The communication device of claim 1, wherein:
the one or more receive antennas comprises a four-by-four multiple input multiple output (MIMO) antenna array having first, second, third, and fourth receive antennas;
the switching matrix is respectively configurable to first, second, third and fourth receive antenna tuning modes that communicatively couple the transmitter to the first, the second, the third, and the fourth receive antennas; and
for each of the first, the second, the third, and the fourth receive antenna tuning modes, the controller executes the CLRAT application to enable the communication device to tune the corresponding one of the first, the second, the third, and the fourth receive antennas.

7. A method comprising:
configuring, by a controller, a switching matrix of a radio frequency (RF) frontend of a communication device to a receive antenna tuning mode that communicatively couples a transmitter to a first receive antenna of one or more receive antennas;
transmitting a reference signal using the first receive antenna at a selected transmit power level setting of the transmitter;
measuring, using a feedback receiver, magnitude and phase values of both a forward coupled transmission signal and a reverse coupled reflection signal of the reference signal;
determining an impedance value of the first receive antenna based on the measured magnitude and phase values and the reference signal transmitted at the selected transmit power level setting; and
tuning the first receive antenna by an antenna tuning module using the impedance value.

8. The method of claim 7, wherein transmitting reference signal comprises transmitting sounding reference signal (SRS) symbols using the first receive antenna at the selected transmit power level setting of the transmitter.

9. The method of claim 7, wherein:
measuring magnitude and phase values of the transmission signal of the reference signal using the feedback receiver comprises configuring, in a forward coupled state, a switched switchable coupler through which the transmission signal and the reflection signal pass; and
measuring magnitude and phase values of the reflection signal of the reference signal using the feedback receiver comprises configuring the switched switchable coupler in a reverse coupled state.

10. The method of claim 7, wherein determining the impedance value comprises accessing tune codes based on prior open, short, load (OSL) characterization of the RF frontend that are provisioned in the antenna tuning module, the tune codes indexed to the magnitude and the phase measurements to provide the impedance value.

11. The method of claim 7, wherein:
the one or more antennas comprises a two-by-two multiple input multiple output (MIMO) antenna array;
configuring the switching matrix to the receive antenna tuning mode comprises selecting, in sequence, each one of a first and a second receive antenna tuning mode that communicatively couples the transmitter respectively to a first and a second receive antenna of the one or more antennas; and
the method further comprises tuning the corresponding one of the first and the second receive antennas using impedance determined based on transmitting the reference signal.

12. The method of claim 7, wherein:
the one or more antennas comprise a four-by-four multiple input multiple output (MIMO) antenna array;
configuring the switching matrix to the receive antenna tuning mode comprises selecting, in sequence, each one of a first, a second, a third, and a fourth receive antenna tuning mode that communicatively couples the transmitter respectively to a first, a second, a third, and a fourth receive antenna of the one or more antennas; and
the method further comprises tuning a corresponding one of the first, the second, the third, and the fourth receive antennas using impedance determined based on transmitting the reference signal.

13. A computer program product comprising:
a computer readable storage device; and
program code on the computer readable storage device that when executed by a processor associated with a communication device having one or more receive antennas, an antenna tuning module, and a radio frequency (RF) frontend, the program code enables the communication device to provide the functionality of:
configuring, by a controller, a switching matrix of the RF frontend of the communication device to a receive antenna tuning mode that communicatively couples a transmitter to a first receive antenna from among the one or more receive antennas;
transmitting a reference signal using the first receive antenna at a selected transmit power level setting of the transmitter;

measuring, using a feedback receiver, magnitude and phase values of both a forward coupled transmission signal and a reverse coupled reflection signal of the reference signal;

determining an impedance value of the first receive antenna based on the measured magnitude and phase values and the reference signal transmitted at the selected transmit power level setting; and tuning the first receive antenna by the antenna tuning module using the impedance value.

14. The computer program product of claim 13, wherein the program code enables the communication device to provide the functionality of: transmitting reference signal comprising sounding reference signal (SRS) symbols using the first receive antenna at the selected transmit power level setting of the transmitter.

15. The computer program product of claim 13, wherein the program code enables the communication device to provide the functionality of:

measuring magnitude and phase values of the transmission signal of the reference signal using the feedback receiver by configuring, in the forward coupled state, a switched switchable coupler through which the transmission signal and the reflection signal pass; and measuring magnitude and phase values of the reflection signal of the reference signal using the feedback receiver by configuring the switched switchable coupler in the reverse coupled state.

16. The computer program product of claim 13, wherein the program code enables the communication device to provide the functionality of determining the impedance value comprising accessing tune codes based on prior open, short, load (OSL) characterization of the RF frontend that are provisioned in the antenna tuning module, the tune codes indexed to the magnitude and the phase measurements to provide the impedance value.

17. The computer program product of claim 13, wherein the program code enables the communication device to provide the functionality of:

configuring the switching matrix to the receive antenna tuning mode by selecting in sequence each one of a first and a second receive antenna tuning mode that communicatively couples the transmitter respectively to a first and a second receive antenna of the one or more antennas comprising a two-by-two multiple input multiple output (MIMO) antenna array; and tuning the corresponding one of the first and the second receive antennas using impedance determined based on transmitting the reference signal.

18. The computer program product of claim 13, wherein the program code enables the communication device to provide the functionality of configuring the switching matrix to the receive antenna tuning mode comprises program code that enables the communication device to perform the functionality of selecting, in sequence, each one of a first, a second, a third, and a fourth receive antenna tuning mode that communicatively couples the transmitter respectively to a first, a second, a third, and a fourth receive antenna of the one or more antennas comprising a four-by-four multiple input multiple output (MIMO) antenna array; and the program code further enables the communication device to perform the functionality of tuning the corresponding one of the first, the second, the third, and the fourth receive antennas using impedance determined based on transmitting the reference signal.

* * * * *